Jan. 7, 1947.  F. N. RAWLINGS  2,413,844
ION EXCHANGE TREATMENT OF SUGAR
Filed Jan. 31, 1941  6 Sheets-Sheet 4

INVENTOR.
BY *FRANK N. RAWLINGS,*
ATTORNEY.

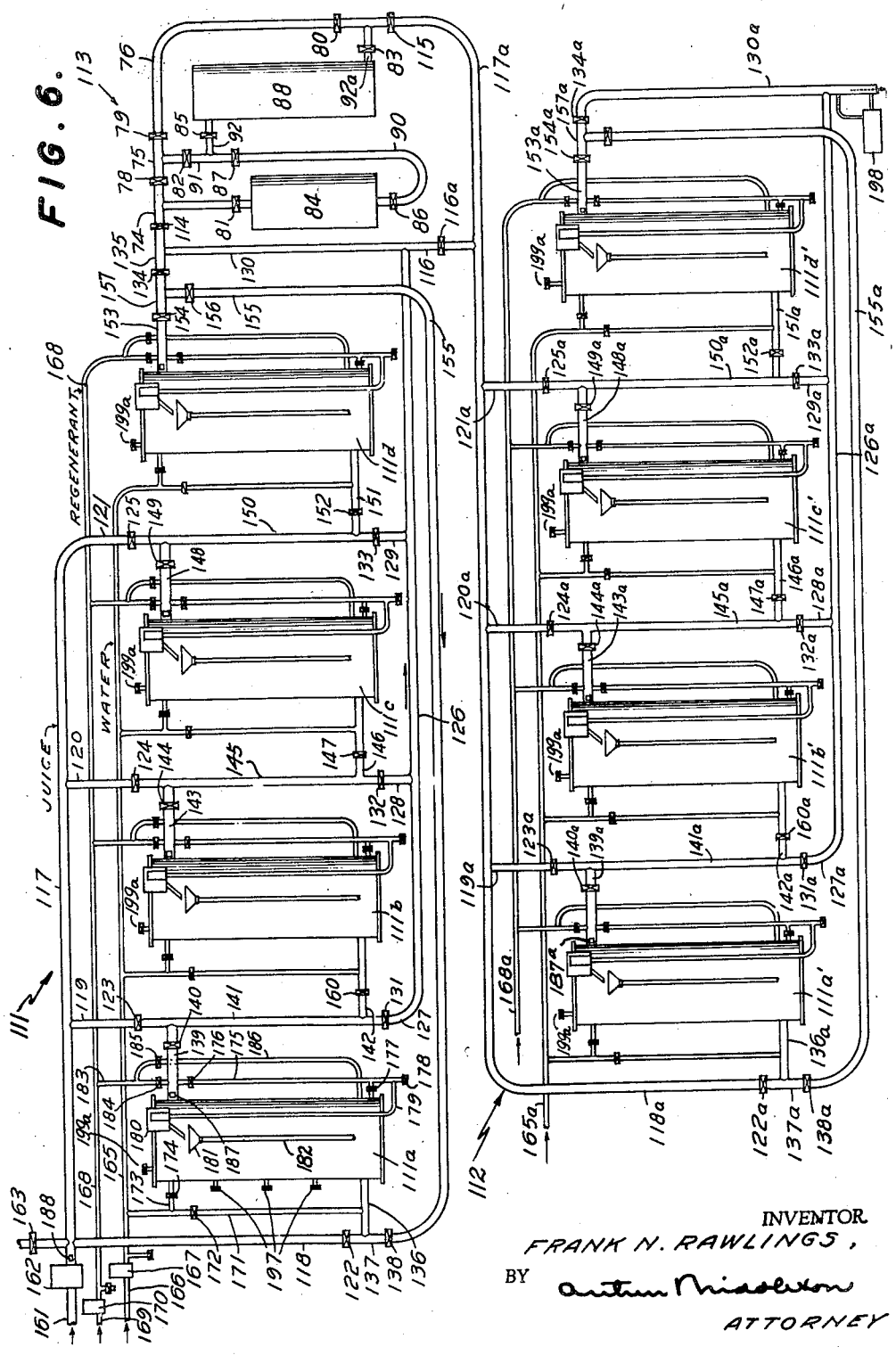

Jan. 7, 1947.   F. N. RAWLINGS   2,413,844
ION EXCHANGE TREATMENT OF SUGAR
Filed Jan. 31, 1941   6 Sheets-Sheet 6

INVENTOR.
FRANK N. RAWLINGS,
BY
ATTORNEY.

Patented Jan. 7, 1947

2,413,844

UNITED STATES PATENT OFFICE 2,413,844

ION EXCHANGE TREATMENT OF SUGAR

Franklin Nathan Rawlings, Westport, Conn., assignor to The Dorr Company, New York, N. Y., a corporation of Delaware Application January 31, 1941, Serial No. 376,717

9 Claims. (Cl. 127—46)

This invention relates to the production of crystallized sugar or sugar syrups from sugar-bearing solutions. The invention pertains to the purification of the juices prior to their being utilized or crystallized, and it is concerned with the removal from the solution of non-sugar impurities, a quantity of which is molasses forming, and consequently the improvement of the efficiency of evaporation and of crystallization as well as increasing the output of crystallized sugar while reducing its loss into molasses; in short, raising the all-around efficiency of the manufacturing process as a whole as well as the quality or purity of the product.

Sugar-bearing solutions for example beet juices should have their non-sugar impurities removed as far as possible, as they interfere with the efficiency of the subsequent treatment steps. Evaporation is interfered with because of the lime salts introduced by the conventional purification treatment itself. Also they tend to increase unduly the viscosity of the liquor in the evaporator as well as to induce foaming. These salts scale up the evaporators, necessitating their periodical shutdown for cleaning. Crystallization is hampered by impurities causing a (1) reduction in the quality of the crystallized sugar, and (2) loss of a quantity of the sucrose for crystallization due to molasses formation. To recover some of the sugar from the molasses, it must be reworked in an additional process, such as the Steffens process. The impurities, in fact, are liable to burden the entire manufacturing process in still other ways which will be more fully set forth.

The result of the treatment steps for a sugar-bearing solution, for example beet sugar juice in use at present is to actually eliminate only those non-sugar constituents which are coagulated, or precipitated, or volatilized by the combined action of heat and lime on the juice, carbonation treatment, when used, serving mainly to condition the suspended matter for settling, and to remove excess lime. This, however, represents only a partial removal of impurities. There remain in the juice after solids removal treatment as heretofore practiced, appreciable amounts of dissolved inorganic matter, dissolved organic matter, color constituents and colloids. The inorganic impurities are largely in the nature of salts which stay in solution. Also the color constituents have been difficult if not impossible of removal directly from the juice.

So, it is among the broader objects of this invention to improve the efficiency of the manufacturing process as a whole by greater removal of the impurities among which especially is dissolved matter, the removal of which heretofore has not been practically or commercially successful. In this connection, the invention aims at reducing the content of the dissolved inorganic matter in the purified sugar-bearing solution, as well as the content of the dissolved organic impurities.

Another object is the removal of color imparting impurities from the sugar-bearing solution.

To obtain these ends, it is proposed to subject the sugar-bearing solution to treatment with organic cation and anion exchangers. Briefly, the essence of such chemical exchange treatment is that those dissolved impurities that behave as electrolytes and dissociate or ionize into cations and anions in solution have substituted for their radicals hydrogen and hydroxyl ions respectively. That is, the exchange takes place only between ions of the same electrical charge. This dual exchange results in the formation of acids in the cation exchanger due to the exchange of the cations for hydrogen ions, and in the formation of water in the anion exchanger due to the exchange of anions for the hydroxyl ions of the impurities. This exchange treatment is in distinction from preceding pre-treatment or solids removal steps and is herein called purification.

Features of the invention also relate to modifications in the clarification phase of customary flowsheets, in correlation with the exchange purification treatment of the juice. In this way some of the functions heretofore imposed upon and expected to be performed by the solids removal or clarification steps, may be taken over and performed more effectively by the proposed exchange treatment. According to a specific feature of this invention, in the treatment of beet juices it is proposed to omit the customary sulfitation, and to send the juice from carbonation substantially directly to the compound exchange station. Thus calcium is removed by cation exchange instead of by sulfitation.

Other features relate to the use of a variety of organic cation and anion exchangers and especially exchangers that resist an acid environment.

Still other features have to do with a mode or modes in which the exchangers are operated, and with equipment associated with, or representing the exchange station.

The present process for the treatment of sugar juice may be said to comprise clarification by some or all of the usual solids removal steps now practiced, and herein briefly referred to as clarification. Clarification for the present purposes is a word selected because of the predominance of the solids removal function in the usual steps ahead of evaporation. Discounting various possible modifications such as preferential arrangement of heaters, modifications in liming, manner of conducting the carbonation, such clarification steps may be said to include in the treatment of beet juice, preliming, heating, liming after heating; carbonation in one or more stages, clarification, filtration, or centrifuging, or a combination of these to remove precipitates, and pH adjustment by sulfitation. With respect to sugar cane juice, treatment involves chemical dosing, mixing, heating, flocculation, and sedimentation of non-sucrose matter, and is generally called defecation. The sequence of these steps may vary in different localities.

The thus partally treated juice is subjected to further purification by combined exchange treatment, with the aid of organic exchangers, sometimes called organolites, that is, treatment by an organic cation or base exchanger operating in the hydrogen cycle and by an organic anion or acid exchanger operating in the hydroxyl cycle. The emphasis herein upon the organic nature of the exchangers is in distinction from those classed as of inorganic nature.

The principle of the ionic exchange mechanisms involved, and the general behavior of the organolite exchangers, will now be set forth as follows:

Mechanism of chemical reaction of the cation or base exchange

The cation or base exchanger contemplated for use in connection with this invention is of organic nature, and for the purpose of regeneration is treated with solutions of acids from which active hydrogen ions are taken up by the exchanger. Subsequently, when water solutions of salts are contacted with these exchangers, the cations of the solutions are taken up by the exchanger in exchange for hydrogen ions which the exchanger had previously taken up from the acid. Consequently the solution is left containing the corresponding acid of the salt which the solution had originally contained. As an example, if sodium chloride solution is passed through such an exchanger, the effluent solution contains hydrochloric acid in place of part or all of the sodium chloride. This action continues until the effectiveness of the exchanger is depleted, which condition is herein referred to as exhaustion. After exhaustion, for the purpose of regenerating the base or cation exchangers, it is desirable to treat the mass or bed thereof with a solution containing a relatively high concentration of hydrogen ion, in other words, an acid solution which is strong enough to reverse the equilibrium and to cause the exchanger to give up in exchange for the hydrogen ions of the regenerating solution, the ionic impurities it has collected from the juice. For the purpose of regeneration it will be usually desirable to employ either sulfuric or hydrochloric acid, although nitric acid ($HNO_3$) and phosphoric acid ($H_3PO_4$) may also be among the regenerant acids to be used.

Thus, the fundamental reactions of these organic base exchangers if properly generated, are equilibrium reactions whereby cations of the solution are taken up and replaced with hydrogen ions. Moreover, these organic cation exchangers have the capacity to take up sodium and potassium cations which are so prevalent in the non-sugar impurities of the sugar-bearing solution, as well as most all of the other cations contained in the juice. Cation exchangers operating in this manner are said to be operating in the hydrogen cycle.

Chemical mechanism of the anion or acid exchange

The anion exchanger to be used in combination with the above described cation exchanger is likewise of an organic nature. It has the capacity, when treated with alkali hydroxides or alkali carbonates, for instance, $Na_2CO_3$, $NaOH$, $KOH$, $K_2CO_3$, $NH_4OH$, to take up hydroxyl ions (OH). Consequently, when aqueous acid solutions as such or acid solutions resulting from the above-mentioned cation exchangers, are contacted with these organic acid exchangers thus generated, the anion of the acid is taken up by the anion exchanger and replaced by the hydroxyl ion from the exchanger. Exchangers operating in this manner are said to be operating in the hydroxyl cycle. When the exchange capacity of these organic acid exchangers is depleted, they may be regenerated for reuse by again treating them with alkali hydroxide or alkali carbonate solutions of sufficient strength.

By using the above described cation and anion treatment in combination, the treatment by cation exchanger replaces with hydrogen ions some or all of the cations of the ionic impurities whereby acid is formed while the anion exchanger replaces with hydroxyl ions some or all of the anions passed to it from the cation exchanger in the form of acid whereby water is formed. So by the combined treatment there is a net exchange replacing the salt from the sugar-bearing solution, with a molar equivalent of pure and evaporatable water.

The operation of the exchange mechanism itself might be illustrated as follows: consider the case that among other salts, potassium chloride is to be removed from the sugar-bearing solution. The cation exchanger to be used is of organic nature and for instance of the resinous type, and it is assumed to have taken up H-ion in the course of its previous regeneration. Upon contacting the sugar-bearing solution with the exchanger, the latter will exchange its H-ion for the potassium cation of the salt and form hydrochloric acid (HCl) according to the following equilibrium: Let X represent the organic structure or framework of the cation exchanger. Then:

(A) $XH + K^+ + Cl^- \rightarrow XK + H^+ + Cl^-$

After all or substantially all of the exchangeable H-ions have been replaced with potassium or other cations, for instance, Na, Ca, Mg, Fe, Al, as the case my be, from the juice, the exhausted exchanger is contacted with an acid solution of sufficient acidity, such as HCl, in which case the equilibrium condition is reversed as follows:

(B) $$XK + H^+ + Cl^- \rightarrow XH + K^+ + Cl^-$$

This represents that the exchanger is again ready for contacting with sugar-bearing solution, while the potassium compound is available in the spent regeneration liquor and thus recoverable. Other acids, such as $H_2SO_4$, $HNO_3$, may be used instead of HCl for regeneration of the cation exchanger with corresponding results.

The solution according to Equation A has been acidified because of its reaction with the cation exchanger, since from the cation treatment it will have all or part of its anions converted to their corresponding acid, and so the chlorides, for instance, will have been converted to HCl.

By contact of the solution with an anion exchanger, for instance, of the resinous type and containing replaceable hydroxyl groups, the anion of the acid (HCl) present in the solution according to Equation A is taken up by the exchanger in exchange for the OH-group, and the following equilibrium established: Let Y represent the organic structures or framework of the anion exchanger. Then:

(C) $$YOH + H^+Cl^- \rightarrow YCl + HOH$$

In this way the cation as well as the anion of the salt constituting the impurity are removed from the sugar-bearing solution and replaced with a molar equivalent of water.

When all the exchangeable hydroxyl (OH) groups have been replaced with Cl or other anions from the sugar-bearing solution, for instance $SO_4$, $SO_2$, $NO_3$, the exhausted exchanger is contacted with an alkaline hydroxide or carbonate solution of sufficient alkalinity, such as NaOH, $NA_2CO_3$, KOH, $K_2CO_3$, $NH_4OH$, to reverse the equilibrium as follows:

(D) $$YCl + Na^+ + OH^- \rightarrow YOH - Na^+ + Cl^-$$

The organic cation or base exchangers and organic acid or anion exchangers which may be used in this process include a variety of both.

Among the cation exchangers which may be used are:

1. Cation exchangers produced by the treatment of humic compounds with sulfur compounds which introduce acid sulfur groups into the humic substance so treated, such as treating lignite with concentrated sulfuric acid or equivalent. Materials of this class which have been stabilized by special treatment to prevent color throwing are also applicable.
2. Cation exchangers produced by treating materials containing aromatic phenols, such as tannins, with sulfuric acid, petroleum acid sludge, fuming sulfuric acid or equivalent agent which causes both the condensation of phenolic material and the introduction of acid sulfur groups to the condensed material.
3. Cation exchangers produced by the condensation of aromatic phenols with an aldehyde with or without the aid of catalysts.
4. Cation exchangers produced by the condensation of aromatic phenols with an aldehyde and with or without the aid of catalysts and into which acid sulfur groups have been introduced prior to, simultaneous with or subsequent to condensation.

A variety of organic anion exchangers which may be used comprises:

1. Anion exchangers produced by the condensation of an aromatic amine with an aldehyde.
2. Anion exchangers produced by the condensation of a mixture of an aromatic amine and a mono or disaccharide with an aldehyde.
3. Anion exchangers in which the active constituent is a basic dye stuff, such as the aniline blacks, which are insoluble in water and in aqueous acids and alkalis.

Among several variations in the ways of subjecting the sugar-bearing solution to the action of the organolite exchangers are the following:

a. Contacting the solution with the exchangers in different ways, such as:
   1. Passing the solution through beds of the exchanger material, and
   2. Suspending the exchanger in the solution being treated, and possibly agitating the same by hydraulic or mechanical agitation, and
b. Contacting the solution with the exchangers at different temperatures selected to guard against inversion that has a tendency to occur at higher temperatures.

As an example, a conventional system for the production of sugar from beets comprises the following main treatment phases: Extracting the sugar from the sliced beets (cossettes) in diffusion batteries for obtaining diffusion juice; purifying the diffusion juice by liming, and by carbonation usually in two stages followed by sulfitation, and by the removal from the juice of solids thus coagulated or precipitated, resulting in what is called thin juice; concentrating the thin juice by evaporation into thick juice; subjecting the thick juice to vacuum boiling in vacuum pans to effect further concentration and to induce the formation of sugar crystals; and centrifuging the crystallized mass or fillmass thus obtained, to separate the crystals from their menstruum which contains uncrystallized sucrose, non-sucrose impurities, and coloring matter. While this menstruum may be treated for further yield of crystallized sugar as by re-boiling, re-purification, re-crystallization, and re-separation, there is a final residue left from which a further yield of crystallizable sugar can be obtained only by special de-sugarizing processes exemplified by the Steffens process. If Steffens treatment is not available or too expensive, whatever crystallizable sugar is left in the molasses represents a loss in marketable crystallized sugar.

In a conventional process, heat and liming are relied upon to coagulate, precipitate, and decompose as much of the non-sucrose impurities as possible. Part of the lime goes into solution in the sugar juice and reacts with some of the impurities present therein. It combines with any free acid present such as organic acids, and it displaces potassium and sodium from the alkali salts of those acids whose lime salts are insoluble. Oxalic and phosphoric acids, and their alkali salts, are typical of this class of compounds which are removed from solutions by lime.

Beet sugar making practice furthermore usually calls for the introduction into the juice of $CO_3$ or $CO_2$-containing gases to react with lime or calcium compounds such as lime sucrate or lime saccharate in the juice, to form calcium carbonate that is effective in collecting and weighting down as much as possible of the previously coagulated and other suspended matter. This gassing step is called carbonation.

But some excess of the calcium resulting from the liming and present in the juice after carbonation becomes an impurity and must be removed because of its tendency to scale in the evaporators. Hence, carbonation requires careful control, which is carried out usually in two stages, with solids removal or filtration in between. The carbonation treatment should be controlled to leave the juice with a pH of 9.0 for the reason that further reduction in alkalinity by $CO_2$ would cause certain soluble lime salts to stay in the juice instead of precipitating as calcium carbonate ($CaCO_3$), which adds to the difficulty of scaling and also interferes with the crystallization of the sugar. It is therefore customary that the finished carbonated and filtered juice be subjected to sulfitation, that is, treatment with $SO_2$ or $SO_2$-containing gases, in order to adjust the pH to the desired degree by precipitating some of the residual lime without the formation of scale producing calcium compounds. However, sulfitation causes introduction of sulfites into the juice, which in turn will be found eventually in the finished crystallized sugar where they are objectionable.

No less objectionable than sulfitation for similar reasons is the method of removing dissolved scale-producing lime salts by a displacement reaction with sodium carbonate ($Na_2CO_3$). This substitutes sodium for calcium, the sodium going through to molasses with the attendant increase in the production of molasses and loss of crystallizable sugar. In fact, the inorganic impurities are increased in this instance for the reason that the molar quantity of sodium added is in excess of the calcium removed.

Next, evaporation offers the usual difficulty due to scaling as above referred to, because of the residual calcium compounds in the juice, and the attendant reduction in evaporator efficiency.

Then follows crystallization which, according to the practice frequently encountered, is effected in a succession of three vacuum pans, whereby successive fractions of sugar of successively lower purity are obtained. This method is not free from certain complications:

The boiled-down mass from the first pan is divided, as by centrifuging, into the high purity white sugar which, as such, is substantially directly marketable, and its menstruum or mother liquor containing uncrystallized sucrose, non-sugar impurities, and coloring matter.

The second pan re-works the menstruum obtained from the first, for recovery of intermediate sugar which is of a relatively lower purity, and also separated from its menstruum by centrifuging. But because of its impurity and color, this second sugar in turn is dissolved or remelted, sometimes treated with decolorizing substance and sent back to the first pan for re-crystallization and the recovery from it of additional white sugar.

The menstruum from the second pan is similarly reworked in the third pan for the recovery of brown sugar which may also be re-melted, and dosed with decolorizing substance, but because of its low purity, is sometimes sent back to the pretreatment steps. In fact, its purity is so low and its tendency to crystallize so sluggish that it requires detention in crystallizer tanks for long periods under constant agitation and cooling in order to induce a sufficient degree of crystallization before separation by centrifuge is undertaken. The menstruum or residuum or mother liquor left over from the separation of the brown sugar constitutes the final molasses which contains the residual sugar that can be recovered for crystallization only by some de-sugarizing process, such as the Steffens process above mentioned.

It will now be seen from the foregoing that improvement as to removal of non-sugars from the juice, will not only result in increased recovery of crystallized sugar of high purity, but is also adapted to make itself felt in a cumulative and beneficial fashion throughout the manufacturing process as a whole, in view of the diminished need for remelting, re-purification, re-evaporation, and re-crystallization, and diminished need for de-sugarization or Steffenization of the molasses.

The use of organic cation and anion exchangers, also termed organolites, as employed in the treatment of beet juice according to this invention, involves the substitution of chemically produced water for its molar equivalent of dissolved ionic impurities. This should be distinguished from a type of exchange treatment involving the use of materials classed as zeolites. They are of inorganic nature and function by way of neutral cation exchange only, such as the sodium cycle. They merely substitute one non-hydrogen cation for another.

By way of contrast between the organolites of this invention and the zeolites, the character and function of the latter is outlined as follows: zeolites are granular solids substantially insoluble in neutral waters and aqueous solutions. These zeolites when treated or generated with strong solutions of neutral alkali salts such as sodium chloride, take into their structure, as by polar adsorption, the cations of strong solutions. Zeolites are not stable in the presence of alkali or acid, hence neutral salts must be used for generating them. As they are unstable in the presence of acids, they will disintegrate, and therefore cannot be used in the treatment of acid liquids. When hard water solutions are passed through, or treated with these zeolites generated in the above manner, they have the capacity of exchanging their alkali ion for the alkaline earth ions and some of the other cations of the water being treated, thus softening the water. Its boiler scaling capacity can thus be reduced, or its soap consuming effect be diminished. When the exchange capacity of the zeolite is depleted, it can be regenerated by treating it again with the alkali salt solution, etc., whereupon the zeolites can be reused. At any rate, because these are equilibrium reactions in which alkali ions (cations) alone are affected, this involves no actual reduction in the molar concentration of the salts in solution.

As regards the purification of sugar solutions or sugar juice by some form of exchange treatment, the present invention differs from a known process for the treatment of beet juice by a cation exchanger alone, using a specified organic exchanger for that purpose. The objection to this process according to my investigation is (1) that it can only be employed in the production of soft sugar, and (2) that cation treatment alone of the factory juice will produce a juice of low pH because the cation exchanger converts the salt impurities to the acids of their respective anions. As a result serious inversion with its attendant loss of recoverable sucrose would occur if this juice were concentrated in that acid condition. Furthermore, only the cation portion of the impurities could be eliminated.

Further, there is a known process relating to the deacidification of liquids, especially water. This treatment covers the treatment of industrial waters exclusively, especially boiler feed water, by cation exchange followed by abstracting the acid with metal oxide gels, but is also applicable to sugar solutions. Up to the present time the metal oxide gel method of abstracting the acid does not appear to have been put into practical use probably because of inherent difficulties due to the fact that the metal oxides are soluble in acid solutions and the exchanger beds would dissolve and disintegrate, if subjected to solutions of any appreciable acidity. Also the difficulty of washing out the residual alkaline generating solution from the metal oxide gel would be very difficult, and if this is not done, the acidity of the solutions treated is merely neutralized and not extracted. When sugar solutions are passed through a cation bed, the acidities developed are of the order of 0.05 N, that is, ten times those which would be encountered with water of the composition given by Liebknecht. Even concentrations of the latter magnitude, 0.005, would soon render metal oxide beds inoperative.

In the case of the present invention, sugar juice is subjected to both cation and anion exchange, both exchangers being of organic nature. One of a variety of organic cation exchangers considered suitable for the purpose of this invention is of the resinous type such as exemplified in the U. S. patent to Holmes No. 2,191,853, where the exchanger is described as a synthetic resin of the polyhydric phenol-formaldehyde type which is sulphited to a degree such that its sulphur content is not less than 2.4 per cent. An organic anion exchanger considered suitable for the purpose of this invention is also of the resinous type and is exemplified in the U. S. patent to Adams and Holmes No. 2,151,883, describing the exchanger as an insoluble resin-like product obtained by the reaction of formaldehyde with an aromatic amine. Exchangers of the type contemplated for use in connection with the invention, are substantially stable in the presence of acids and alkalis.

In this way the cation exchange treatment is supplemented by treatment with an acid or anion exchanger which serves to remove the acid anions remaining unaffected by the cation treatment, and replace them with hydroxyl ion, thus forming water, and reducing the molar concentration of the ionic impurities. This combined ionic exchange results in a juice of sufficiently high pH to be concentrated and crystallized without substantial inversion. A substantially neutralized purified sugar juice can be obtained according to the practice of this invention, along with the removal of the cations and anions. Among the inorganic impurities removable from the juice by this combined treatment will be potassium, sodium, calcium, magnesium, iron, aluminum, chlorides, nitrates, and sulfates.

In the foregoing, as far as the operation of the exchangers is concerned, there has been referred to those impurities of the sugar juice that are dissolved therein and are ionic, that is, subject to collection in the organolite exchangers by chemical replacement. But it is a discovery of mine, that by the practice of this invention other impurities of the juice are collected in the exchangers, that are organic and some of which are probably non-ionic. I have also discovered that by practicing this invention, colloidal matter in the juice is collected in the exchangers, and therefore colloids in the juice, which incidentally are substantially organic, may be said to belong to a group of impurities removable by this process, which impurities are herein classed as non-ionic. It is a further discovery of mine that color imparting constituents of the juice are also collected in the exchangers. Indeed from the usual yellow colored juice fed to the exchangers, an effluent juice emerges therefrom that is water-white.

In conjunction with the procedure of regenerating the exhausted exchangers I contemplate the recovery of impurities from the juice as by-products in the spent regenerating liquor. In this way I contemplate for instance the recovery of potassium removed from the juice by cation exchange, for its by-product or fertilizer value. Nitrogenous matter also may constitute part of the values recovered in the spent liquor.

After exhaustion of the exchangers, that is, depletion of their capability to collect impurities from the juice, they must be regenerated if the process is to be made in effect continuous. An exhausted exchanger bed is cut out of the line when a regenerated exchanger has been substituted therefor. Preparatory to regeneration, the depleted or exhausted exchanger bed must first have its juice content displaced with water and this displacement preferably takes place from the top toward the bottom, or in a downward direction because the juice is heavier than the water. Next comes a back-washing of the bed in an upward direction with wash water to remove from the bed as much as possible of the collected non-ionic impurities and especially those in solid phase. The next step is the regeneration phase per se. It consists in passing the regenerant through the bed until the bed is regenerated. In a cation bed, the regenerant is an acid whereas in the anion bed, it is an alkaline reagent. The passage of the regenerant through the beds is preferably from top to bottom, or downwardly. The regenerant removes from the bed those impurities that have been collected by ionic exchange. The collected ionic impurities are removed from both cation and anion exchangers as a salt in the spent regenerating liquor.

After regeneration has been completed, unused regenerant or regenerating liquor must be well washed from the exchanger beds by means of wash water. In the case of the anion exchanger, if any unused regenerant is left in the bed, when sugar-bearing solution is newly supplied thereto again it will react with the unused regenerant and be rendered neutral thereby. That is to say, the acid produced in the juice by the preceding cation exchange treatment will be neutralized by the unused regenerant, and the salt will remain in solution.

The color constituents have been observed to leave the beds with the spent regenerant substantially from the anion beds, although possibly some may be removed in the bed washing steps.

When cane juice is treated in a manner according to this invention, the situation is substantially as follows:

The usual practice of cane juice clarification differs from customary beet juice treatment in that the cane juice is subjected to treatment which involves mainly liming the juice in combination with heating to coagulate the impurities thus coagulatable, followed by solids separation steps. In cane juice technology, these treatment steps are known as defecation, and according to current practice this is usually understood to convey that the liming of the cane juice is carried out in a manner to leave the juice with a pH of the order from around 6.5 to around 8.6. The suspended solids are usually removed from the juice by a clarifier which may be followed by a filter to handle the clarifier sludge, and clarified juice and clear filtrate are then sent to evaporation without an attempt to reduce the alkalinity of the juice by intermediate treatment steps such as might correspond to carbonation and sulfitation steps.

In the defecation processes currently used in the treatment of cane juice, in distinction from the coagulatable matter there have not been removed to any appreciable extent ionic impurities comprising inorganic matter in solution, and they have largely gone through to molasses with the attendant loss in sugar. Of the non-ionic non-sugars, comprising dissolved organic matter, only a portion has been removed, the rest going through to molasses.

The elimination of the inorganic non-sugars is important because they tie up definite amounts of sucrose in non-crystallizable form.

Color removal is a problem in the treatment of cane juice, and current defecation processes are incapable of removing it unless considerable $SO_2$ or carbon is applied.

In the treatment of cane juice, liming normally is to be kept to a practical minimum and substantially within the range above indicated, because the strongly alkaline lime is the cause of several detrimental effects in the further treatment of the juice. The high rate of liming which precedes the carbonation of beet juice is currently not extensively employed and consequently carbonation itself is seldom resorted to. The alkalinity is very carefully controlled in order to avoid acidity and consequent inversion on the one hand and in order to avoid undesirable excess of alkalinity on the other hand. Yet there is encountered in cane juice treatment a considerable degree of scaling which requires frequent cleaning and overhauling of the evaporators, as the inorganic impurities of the defecated cane juice contain a larger proportion of calcium than is found in clarified beet juice. But when the defecated juice is subjected to ionic exchange treatment according to this invention, calcium and other ions are removed from the juice in the cation exchanger, so that the scaling difficulty is reduced.

Potassium, sodium, and other impurities or salts also present are removed from the juice by cation and anion exchange as previously discussed in connection with the treatment of beet juice.

The low degree of liming of cane juice is further practiced because of the combining of lime with organic compounds such as glucose in the juice. Calcium gluconates, if formed, add to the loss of sugar in molasses, and increase the viscosity of the mass in the vacuum pans and thereby retard and reduce the efficiency of crystallization. Treatment according to this invention will reduce that difficulty, as the calcium ions of the gluconates are also collected in the cation exchanger, and the glucose left as such in the juice.

It follows that in practicing the invention the permissible limits of induced alkalinity in the juice may be extended, if desired.

Furthermore, cane juice has strong color characteristics and is difficult to de-colorize, so that even a relatively pure crystallized cane sugar may nevertheless appear strongly colored. Special and separate refining treatment of the crystallized raw cane sugar is currently needed to purify and whiten it. Since the treatment according to this invention will remove color as well as impurities, this suggests the possibility of eliminating the sugar refining treatment.

Otherwise the treatment of cane juice according to this invention will benefit the operations per se of concentration and crystallization substantially in the manner set forth in connection with the discussion of beet juice treatment above.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 4 is a flowsheet similar to that of Fig. 3, applied to the treatment of cane juice.

Fig. 5 is a more particularized although diagrammatic showing of the exchange treatment batteries proper and associated equipment therefor.

Fig. 6 is a diagrammatic showing of the exchanger batteries proper with the exchanger elements being interconnected in a manner to permit the cutting out and cutting in of the exchanger beds, and also showing connections for wash water and regenerant solution respectively.

Fig. 7 shows a continuous sampling arrangement for a continuous pH indicator or similar instrument.

Figure 1:
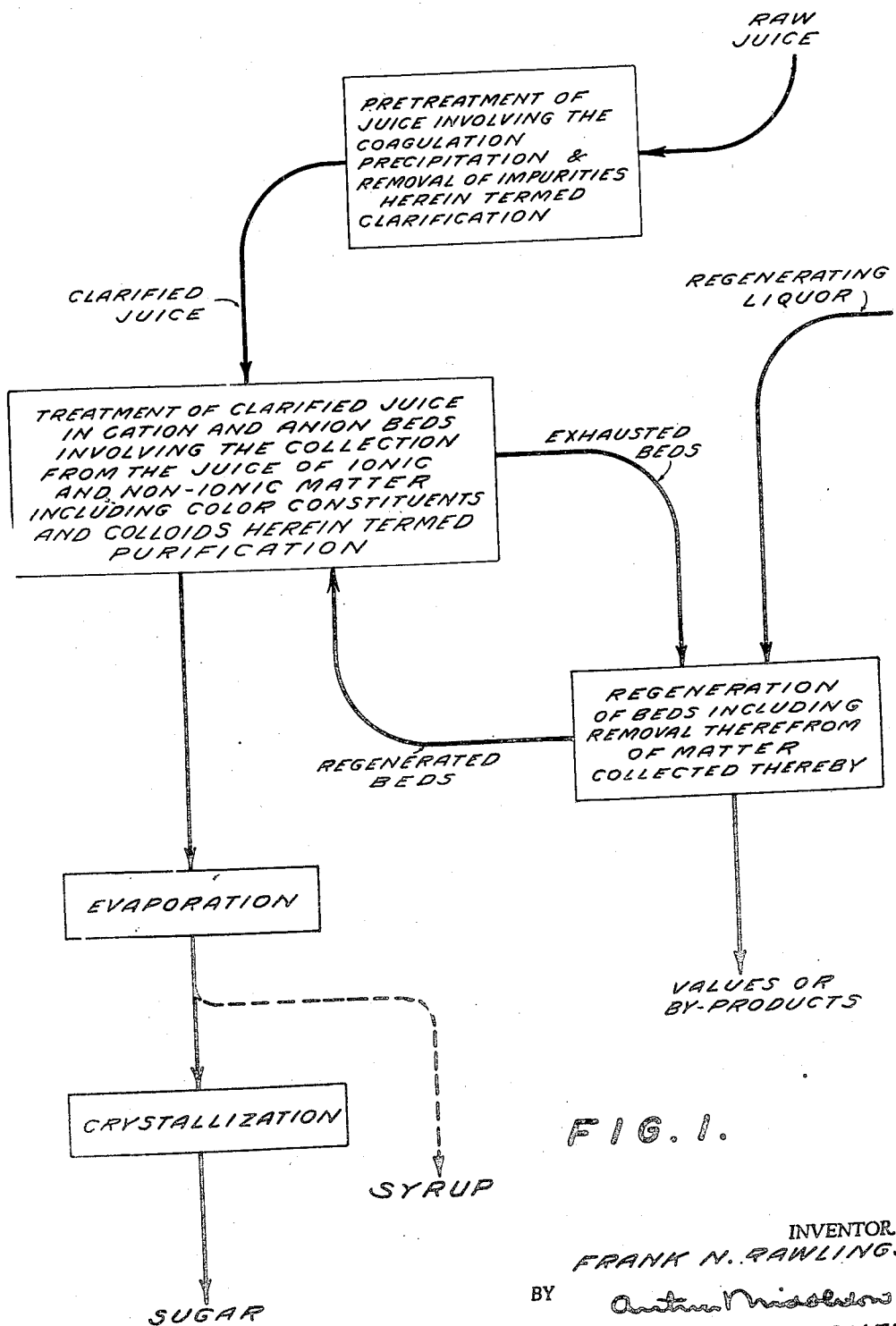
Fig. 1 is a flowsheet for the treatment of sugar bearing solutions in general, indicating the main treatment phases and comprising purification by treatment with exchangers, and the regeneration of the latter.
Figure 3:
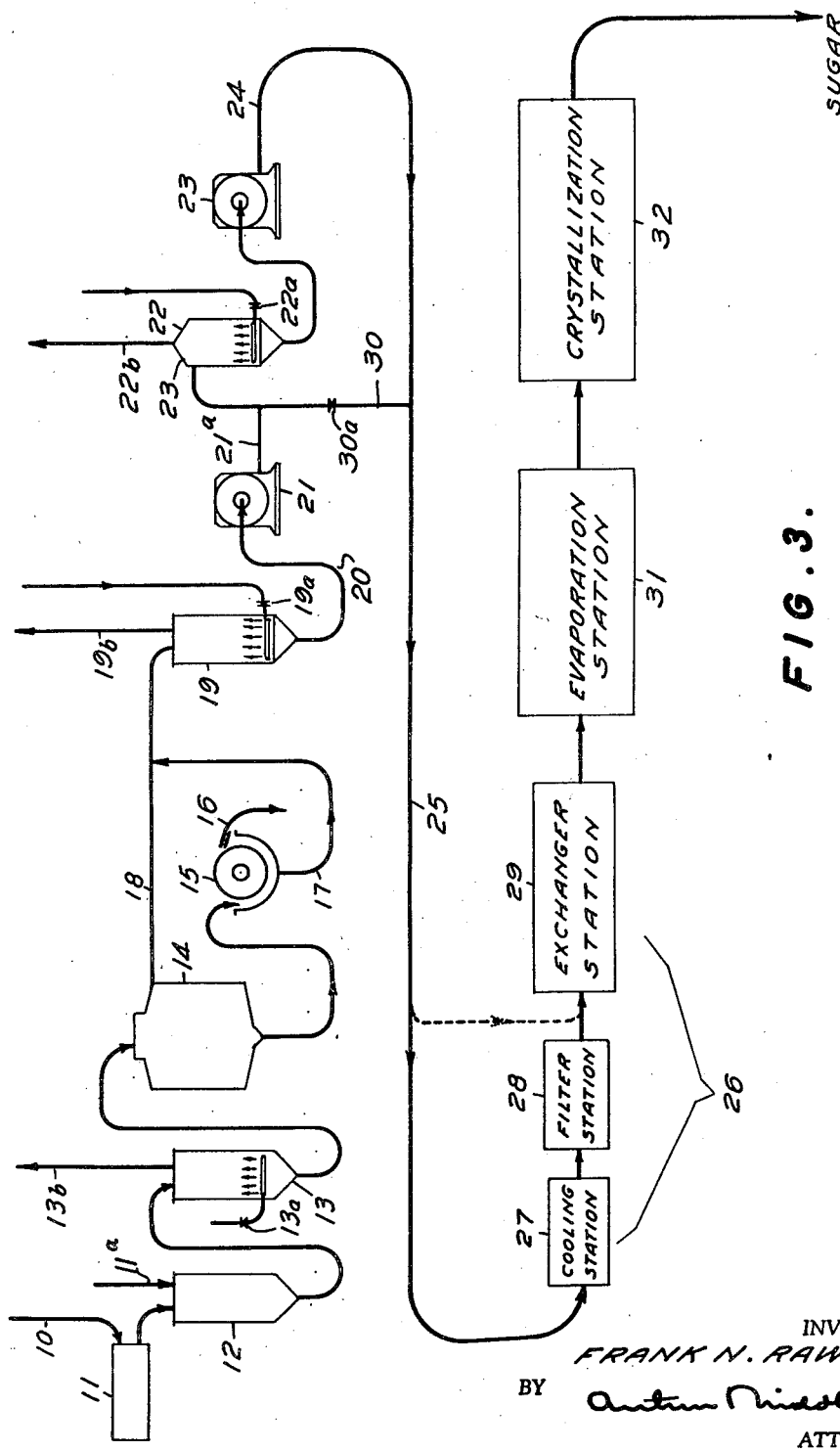
Fig. 3 is a flowsheet more particularized with respect to pre-treatment or clarification steps employed in the treatment of beet juice, and also discerning between the exchange treatment station and certain associated equipment therefor.

Fig. 1 represents a more broadly conceived showing of the phases relating to the treatment of sugar-bearing solutions as a whole, than do the subsequent figures. In that respect it will be noted that the showing in Fig. 1 is so to speak generic to the showing in Figures 3 and 4 representing the application of this invention to the treatment of beet and cane juice respectively. The relation of Fig. 5 to the other figures is that it represents a more detailed showing although diagrammatically of the exchanger station and associated equipment indicated in Figs. 3 and 4, and shown to include a cooling station and a filter station for the juice prior to its entry into the exchanger station proper. Fig. 5 thus also represents a showing in terms of equipment of the exchange treatment or purification treatment phase indicated in Fig. 1 to follow the pretreatment phase, and followed by evaporation. The crystallization phase shown to follow evaporation is also affected by the consequences of this invention. Furthermore, according to Fig. 1, a procedure which must run parallel to the treatment of the juice, is the regeneration of chemically depleted or exhausted exchanger beds. So they are indicated in Fig. 1 to be segregated or taken out of operation for regeneration, while fresh or regenerated beds may be switched in for re-use instead. There is also indicated the possible operation of recovering of values or by-products from the spent regeneration liquor.

Figure 2:
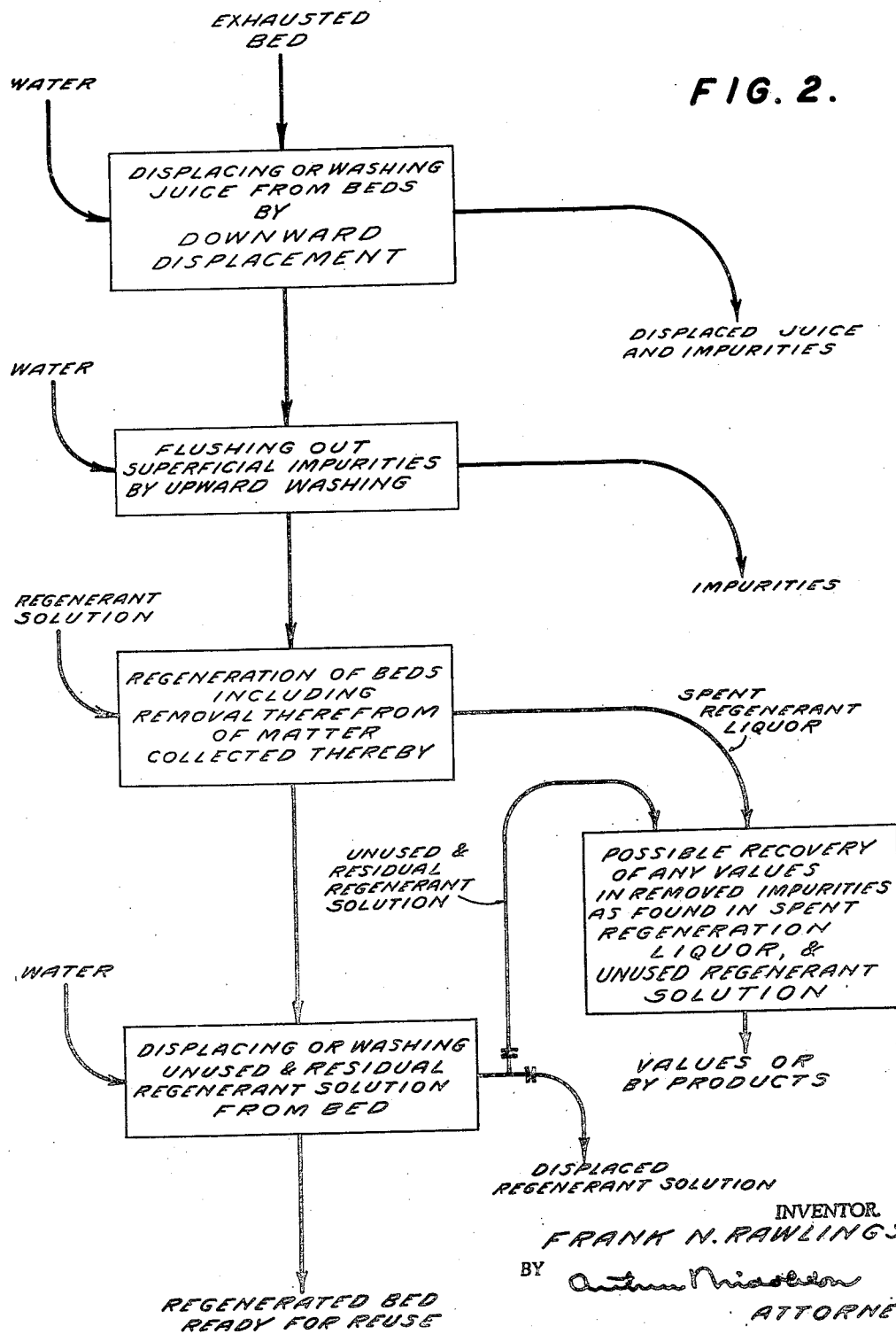
Fig. 2 is a flowsheet in the manner of Fig. 1, but pertaining to steps in the regeneration phase.

In the treatment for regeneration of the exchanger beds there is involved a preparatory or washing operation which precedes their regeneration proper, to displace and wash out from them the juice and other residual matter. Another washing operation is subsequent to regeneration proper, for the purpose of removing unused or residual regenerant solution prior to putting the beds back into service. Therefore, Fig. 2 shows in a diagrammatic fashion similar to Fig. 1 the sequence of such operation, and incidentally in conjunction with possible recovery of values or by-products from the spent regeneration liquor.

It will be understood that in the case of treating beet juice the raw or diffusion juice may first be subjected to a pretreatment or clarification namely for removing coagulatable solids. As an example, according to Fig. 3 this comprises sending the juice 10 through a heater 11, and then through a first liming tank or station 12 where the addition of lime is indicated as at 11$^a$, the lime added in terms of CaO usually being on the order of 0.7 to 1.5/100 c. c. of juice in a straight house, and 2.2–2.7 g./100 c. c. of juice in a Steffens house. Lime alkalinity and heat result in the coagulation of coagulatable solids in the juice.

The limed juice is shown as being sent through a first carbonation station or tank 13 which is herein indicated to be of the continuously operating type. Thus the limed juice is subjected to contact with $CO_2$ or $CO_2$-containing gases to produce a reaction with the calcium compound or lime, forming calcium carbonate ($CaCO_3$) intended for collecting and weighting down the coagulated matter in the juice for the purpose of sedimentation.

The gas enters at the bottom of the carbonation tank as at 13$^a$ and after passing through the body of juice escapes upwardly as shown at 13$^b$. But, first carbonation is carried only to a point of alkalinity well above neutral, at which substantially all of that fraction of coagulated matter can be caused to settle which at lower alkalinities of the juice might become re-dissolved. The juice containing this precipitate enters a clarifier 14 which may be of the multiple tray Dorr type known to be used in this connection. The settled solids or underflow sludge from the clarifier then passes to what is shown to be a continuous rotary filter 15 for instance of the Oliver type. The filter cake is discharged as at 16, and the clear juice or filtrate 17 joins the clear overflow juice 18 from the clarifier in entering a second carbonation stage or tank 19 which may be substantially similar to the first continuously operating carbonation stage 13, the gas entry being shown at 19$^a$ and gas exit at 19$^b$. Here carbonation is continued in terms of alkalinity until a point corresponding to a pH of 9.0 is reached. Here again carbonation must be regulated very accurately in order to guard against the formation of soluble carbonates which would stay in solution in the juice as an added non-sugar or impurity adapted to contribute to scaling.

Hence, at the proper point second carbonation is broken off, and the carbonated juice sent as by way of a flow connection 20 through a filter press 21, and then by way of line 21$^a$ on to a sulfitation station or tank or tower 22 where it is treated with $SO_2$ or $SO_2$-containing gas until the desired pH is established in the juice, the gas being indicated to enter the tower as at 22$^a$ and, after contacting the body of juice in the tower, to leave the tower as indicated at 22. Precipitate which may have been formed in the sulfitation station is removed from the juice when it is next sent through another filter press 23, resulting in a clarified juice 24, called thin juice. Heaters for the juice are variously employed where desired throughout the treatment process so far described, but are herein not particularly shown. Various modifications in the operations relating to liming, carbonation, and solids removal are possible in the light of various practices.

Still, the juice which results from what is herein termed the clarification phase of the treatment process, has left in it a quantity of impurities and dissolved matter comprising scale forming salts and other inorganic salts, organic dissolved matter, and color constituents. The undesirable effect of these non-sugars which heretofore were currently not removed from sugar juices, contributes to increase of molasses formation, loss of sugar, scaling, foaming, reduced efficiency of evaporation and crystallization, as well as reduced total efficiency and economy, as has herein been indicated.

As regards the quality of the product itself, that is, the purity of the sugar, there is often found in beet sugar an $SO_2$ content which is undesirable. Furthermore, the ash content comprising traces of potassium and nitrogen found to be present in the finished beet sugar will sustain the growth of spores, allowing them to multiply in storage. The presence of these impurities in candy making causes the appearance of foam and scum when boiling. The effects from the presence of spores sustained by the impurities are also noted in the manufacture of beverages.

However, these undesirable effects can be minimized if the juice clarified in the above manner is subjected to purification treatment by ionic exchangers according to the invention. The clarified juice passes through a flow connection 25 to a purification treatment station collectively designated by the numeral 26 and later on to be discussed more specifically in connection with Figures 5 and 6. Suffice it to say at this point that the purification station comprises a cooling station 27, a filter station 28, and the exchanger station 29 proper, through which three stations the juice may be passed in succession.

A by-pass flow connection 30 having a valve 30$^a$ is shown to lead from the flow connection 20 into the flow connection 25, so that the sulfitation station 22 and filter press 23 can be by-passed.

This provision permits to omit sulfitation, in order to send the carbonated juice as such to the purification station 26. In this way the burden of pH adjustment currently effected by sulfitation may be placed where it can be realized without the drawback of sulfitation, namely, by calcium removal through cation exchange.

The juice thus purified in the purification station 26 can be evaporated more readily and efficiently in evaporators 31, and due to the reduction in molasses it can be handled with greater efficiency in crystallization station 32. Consequently, there is apt to be a greater direct white sugar yield from the first vacuum pan, and consequently, fewer intermediate and brown sugar strikes to be boiled. This in turn means that relatively less sugar from the intermediate pan needs be re-melted and returned to and re-crystallized in the first or white sugar pan, and in turn relatively less brown sugar from the third pan be re-melted, clarified, re-evaporated, and re-crystallized. By the same token, that is, reduction of the quantity of molasses, the relative load upon the centrifuges is reduced and their operation improved. The need for molasses treatment by desugaring or Steffenizing is diminished. Economies in fuel, steam, apparatus, machinery, maintenance and labor are still further consequences of this invention. In short, the advantages gained from the intensified purification of the juice, as effected by this invention, are distinctly cumulative throughout the treatment process as a whole.

The showing in Fig. 4 diagrammatically indicates the case of cane juice treatment. As an example, the raw juice 33 enters a liming stage or tank 33ª where it is dosed and treated with a suitable calcium compound such as lime, that is, calcium hydroxide ($Ca(OH)_2$), the introduction of the lime being indicated at 34. This operation is usually known and herein termed as pre-liming in distinction from an additional subsequent liming operation. The pre-limed juice is passed through a heater 35 and from there to a second liming station or tank 36 where lime is shown to be added as at 37. As a result of heat and lime treatment, a quantity of the impurities is now present in the juice in a coagulated state. This juice is then sent by way of line 38 to a clarifier 39, for instance a multiple tray clarifier of the Dorr type, in which the coagulated, suspended and settleable matter is removed as underflow or sludge indicated at 40, while clarified juice leaves the clarifier as overflow 41. The underflow or sludge 40 is further treated in a filter operation wherein a continuous rotary filter 42, for instance an Oliver, may be used. In such instance, however, because of the difficulty of obtaining a clear filtrate in a rotary filter from cane juice sludge, this filtrate is usually sent back to the preceding clarifier for retreatment together with the bulk of the juice, and this return is herein represented by line 41ª from the filter 42 joining the line 38 of the juice entering the clarifier 39. Filter cake is shown to leave the filter as at 42ª.

The overflow or clarified juice 41 is then subjected to purification treatment by passing it to a purification treatment station collectively designated by the numeral 43, and which by way of example may be said to correspond in general to the purification station designated by numeral 26 in Fig. 3, and shown in greater detail in Figs. 5 and 6. And so, the more detailed showing as in Figs. 5 and 6 of the purification station, and the discussion of its operation as hereinafter given, for the purpose of this invention may be said to apply to both beet juice and cane juice treatment substantially alike. Consequently, in Fig. 4 the purification treatment station is also shown to comprise a cooling station 43ª, a filter station 43ᵇ, and an exchanger station 43ᶜ. The thus purified cane juice may be sent to evaporation 44 and then to crystallization 45.

Sugar juices, such as beet and cane juice, may be said to differ from each other by reason of some difference in the impurities contained in them, and that difference determines the respective types of pre-treatment currently employed for their clarification. And so, by the same token, the respective clarified juices differ, because of some difference in the amounts or proportions and types of non-sucrose, impurities and color constituents, still left in them even after clarification. In present-day cane sugar making the resulting cane sugar is known as high grade sugar however unrefined, as there are left in it impurities, and especially color, not normally present in factory finished beet sugar as represented by the white sugar aforementioned.

Yet, when the respective juices are submitted to the exchange purification treatment according to this invention, there is effected the removal of non-sugars, dissolved, inorganic, organic, ionic, non-ionic, color constituents, and colloids which currently have not been removed by the pre-treatment from the juices. That is to say, the exchanger may be variously burdened more with one type of an impurity than with another, depending upon the respective prevalence of the one over the other in the respective juices. For example in beet juice potassium and sodium are currently outstanding inorganic impurities, while in cane juice calcium may be in excess of other impurities. To take care of each respective situation in the exchangers is a matter of their operation and balancing, a matter which will be taken up hereinafter when discussing operation. It might be said of this exchange purification treatment of sugar juices, if practiced according to the invention, that it has an equalizing influence as regards the treatment of both kinds of juices, for in both the difficulties due to the presence of the non-sugars may be relieved, and the resulting advantages are similar as regards quality of the end product and as to factory operation.

The treatment according to this invention because of greater elimination of impurities from the sugar juices results in numerous improvements and increased overall efficiency throughout the manufacturing process, and notably in the concentrating and crystallizing operation. Among such improvements are:

Elimination of scaling in evaporators, due to elimination of inorganic matter including lime salts.

Faster and smoother evaporation during concentration, due to greater elimination of colloids and soluble impurities.

Increase in vacuum pan and centrifuge capacity, due to elimination of the aforementioned impurities.

Better quality of sugar both as to appearance and by analysis. Ash content will be reduced, especially the objectionable sulfites and sulfates. Far-reaching reduction in impurities minimizes the chance for undesirable spores in sugars or syrups to multiply.

Materially less molasses is produced, due to reduction of those impurities in the juice which are conducive to the formation of molasses. A concurrent increase in the yield of sugar is effected.

Economies of steam and fuel in the operation of the plant, as well as other economies are effected, for instance due to a relative reduction in the requirements of re-melting, re-purification, re-evaporation, re-crystallizing, etc., initially referred to.

Greater freedom in the conduct of pre-treatment steps.

There will now be given in connection with Figs. 5 and 6 as an example the description of the purification station comprising the exchanger batteries proper and certain accessory or associated equipment, and a discussion of its operation. The disclosure made in Figures 5 and 6 is by way of example and capable of modifications. In Fig. 5 pre-treated or clarified juice 46, still hot from the pre-treatment operation, is supplied through lines 47 and 47ª and through valves 48 and 49 to the cooling station here shown to comprise two sections or stages, namely a heat exchanger 50 followed by a supplementary cooler or booster 51. The juice first passes through the heat exchanger 50 where it is cooled to some degree and economically by utilizing as a cooling medium cooled juice that has already gone through subsequent exchanger treatment and is in turn re-heated for further processing, as will be described. By way of valves 52 and 53 the juice then passes into the supplementary cooler 51 where its temperature is lowered to the desired degree by means of a cooling water supply indicated by inlet 51ª and outlet 51ᵇ. The cooled juice passes on through valves 54 and 55, and then through a line 55ª and valve 56 into a filter station represented by a filter 57 which it leaves through a valve 58 and a line 59 admitting it to the exchanger station "E" proper which is shown to comprise a number of cation exchanger units or beds, operating in series and herein termed a battery designated by number 60, and a battery of anion units or beds numbered 61. In order to operate the cooler and filter station just described, it will be necessary to keep other valves and certain by-pass connections closed. For this reason the valves 62, 62ª, 63, 63ª, and if desired also valve 64 should be kept closed. On the other hand it is possible through by-pass lines 65, 66, 67, 68, 69, and by operating proper sets of valves, to use one of the cooler sections alone or both in series, and to do so in each instance with or without using the filter 57. Also the filter 57 may be used alone, that is to say, with cooler station idle. The cooler station as well as the filter station may be by-passed by sending the juice through lines 68 and 69 directly into line 59 and into the exchanger station "E."

I have discovered that cooling the juice obtained after pre-treatment, is apt to coagulate and precipitate some impurities in the juice. This I have found to be an unexpected phenomenon in that ordinarily great care is taken not to permit the temperature of the juice to drop below what are normally considered safe limits for maintaining desired treatment conditions. Ordinarily the temperature of the juice going through pre-treatment is repeatedly boosted up at various treatment stages, and heating is provided before the juice enters the evaporators. As part of this invention I propose, if I so choose, to operate the exchanger purification station at temperatures lower than those ordinarily prevailing in the juice according to current practice. For instance I have found in treating beet juice obtained after pre-treatment including sulfitation, at a temperature on the order of from 90 to 100 degrees C., that cooling to from 20 to 30 degrees C., would cause the appearance of an appreciable amount of selectively congealed non-ionic impurities in the juice. Such selectively congealed substances if left in the juice may lead to clogging and gradual fouling of the exchanger beds, and at any rate they may lower the exchange efficiency by coating the granules of the exchanger material. I propose thus to selectively congeal and remove non-ionic impurities by intercepting them as in the filter 57.

I may also choose or prefer to operate the exchanger beds at temperatures below those prevailing in the juice according to current treatment practices, because the juice in passing through the exchangers is temporarily acidified. An acid environment develops in the exchanger due to the acidifying function of the cation exchanger, hence, by keeping operating temperatures in the exchangers reasonably low, a condition can be avoided in which acidity and higher temperatures coact to cause inversion of the sucrose in the juice, invert sugars being non-crystallizable and adding to the production of molasses. In this way I have treated beet juice obtained under factory operating conditions that from all appearances remained free from inversion.

From the foregoing it will thus be understood that by operating the exchanger station with the cooling station and the filtration station ahead of it, a dual advantage can be attained.

Thereafter the juice enters the cation exchanger battery 60 herein shown to comprise three exchanger stages or units or beds 60ª, 60ᵇ, 60ᶜ, connected in series. The juice enters the unit 60ª at the bottom, rises through the bed of exchanger material maintaining the same in mildly agitated condition, and from the top thereof flows through a connection 70 to the bottom of the next bed 60ᵇ, and so on up through bed 60ᵇ, down through connection 71, and up through bed 60ᶜ. At this point the juice may have reached a maximum of acidity because it has received hydrogen ion from the exchanger in exchange for the cations of dissolved and ionized salts in the juice, which are collected by the exchanger by chemical mechanism previously explained. In this acidified condition which might be called its intermediate or transitional exchange condition, the juice is transferred to the anion exchanger battery 61 herein also shown by way of example to comprise three stages, units, or beds, numbered 61ª, 61ᵇ, 61ᶜ respectively and which are connected in series by flow connections 72 and 73 enabling the juice to flow upwardly through the beds in succession.

The juice may be transferred from the cation exchange beds to the anion exchange beds directly through lines 74, 75, 76, 77, with valves 78, 79, 80 open, while valves 81, 82, 83 are closed, or it may be treated intermediately as will hereinafter be described.

I may choose to connect the beds in such a manner that an anion bed alternates with a cation bed. In that case the juice passing through the series is repeatedly acidified and de-acidified.

In view of possible gas formation for instance in the cation exchange battery 60 I provide means for evacuating the juice after it leaves the cation battery 60. Such means are represented for instance by an evacuator device of some known construction, functionally interposed between the cation exchange battery 60 and the anion exchange battery 61, and indicated as at 84. If it is desired to switch the evacuator into operation, valve 78 is closed, and so are valves 85 and 83, whereas valve 81, valves 86 and 87, as well as valves 82, 79, 80, remain open. The juice is then free to pass from the last cation bed 60c of the battery 60 through lines 74 and 89 to the evacuator 84, and from there through lines 90, 91, 76, 77 to the first bed 61a of anion exchange battery 61.

I further interpose and arrange for optional use between the cation and the anion exchange batteries a filter device or station indicated as at 88. This filter can be cut out of operation by closing the valves 83 and 85, but can be put in operation by proper use of the valves shown, and believed to be self-explanatory from Fig. 5 of the drawings. In this way the juice is passed through open valves 78, 82, 85, 83, with all other valves closed, and through lines 74, 75, 91, 92, filter 88, and lines 92a and 77.

With the valves and connections shown the juice can be caused to pass through the evacuating device 84 and the filter 88 in series, for conditioning prior to entry into the first bed 61a of the anion exchange battery 61.

It will be remembered from the earlier explanation herein given that in the anion exchange beds the juice having previously been rendered acid in the cation exchange beds, is gradually de-acidified because of the anionic exchange function whereby OH-ions from the anion exchanger are exchanged for the anion of the acid in the juice, forming water. Thus there takes place by the combined or complementary action of the exchangers, a replacement of dissolved inorganic ionic salt by a molar equivalent of water, as the cations and anions of the salt have been collected by their respective exchangers.

Aside from replacing salts with water in this complementary fashion, it should also be understood that the cation exchanger as well as the anion exchanger each per se may collect respective ions from other than purely inorganic ionic substances. An example is the removal by the cation exchanger of the calcium ion in the previously mentioned gluconate found in pre-treated cane juice. Similarly, anions may be taken up by the anion exchanger from compounds other than the straight inorganic ionic salts. In this way the cation beds as well as the anion beds may be burdened with the removal of respective ions from the juice, other than those which constitute the dissolved inorganic salts that are replaced with water. The resulting shifts in burden are taken care of by adequate capacities of the exchangers. Further imposed upon the exchangers is the removal of dissolved organic, and non-ionic matter, and of color constituents, and perhaps of superficial matters attaching itself to the surface of the granules of the exchanger material.

The purified or as it is herein called, the finished juice leaves the last anion exchanger bed 61c through line 93. If valve 94 is closed and valve 95 open, the juice, under conditions here considered is relatively cool, and will pass through a line 96 to and into the heat exchanger 50 ahead of the exchanger station. After thus having cooled down the incoming juice, and in turn having absorbed or recovered heat from it the finished and pre-heated juice passes from the heat exchanger 50 through a line 97 and valve 98, to a heater 99 where its temperature is further raised to a point desirable prior to sending it through valves 100 and 101 into line 102 leading to the evaporators, with the by-pass valve 103 meanwhile closing the by-pass line 104. By opening the by-pass valve 103 and closing the valves 98 and 100 the heater 99 can be cut out of service. The pre-heating operation in the heat exchanger 50 may be cut out by closing valve 95 and sending the finished juice from line 93 through valve 94, and also through valve 105 to a heater 106, and from there through valves 107 and 108, and through the line 102 leading to the evaporators, valves 101 and 109 meanwhile being closed.

With respect to the exchanger beds it is desirable to maintain the operation quasi-continuous and as nearly uniform as possible. This calls for cutting out a bed whose exchange capability is considered depleted or exhausted, and cutting in a fresh or regenerated exchanger bed whenever required. Depletion of the exchange capability of an exchanger bed proceeds substantially in the following manner:

An individual exchanger body or bed of a certain exchanger material will have a characteristic curve according to which its chemical exhaustion proceeds as a function of the volume of solution or sugar juice passed through it under given flow conditions. For a certain period of time a fairly steady or even increasing rate of conversion or exchange intensity will maintain, but will begin to drop off markedly when the so-called point of "break through" of such an exchanger is reached.

Weakening of exchange or chemical force develops because of a gradual decrease in exchange ability or power of the exchanger. To begin, the exchange intensity in the bed is greatest at its inlet end where fresh exchanger meets fresh juice, but is less towards the outlet and where the exchanger meets juice which has already had a quantity of its constituents converted, exchanged, or removed by the exchanger. Consequently, an exchanger becomes exhausted in zone wise fashion progressively from the inlet end to the outlet end. It is therefore well to distinguish between the local exhaustion in a zone of the bed and the average exhaustion of the entire bed.

This consideration is of practical consequence for the establishment of quasi-continuous operation of the exchanger station.

Referring to Fig. 5 as an example, in the operation of the cation exchange battery 60, when the first bed 60a has reached a predetermined degree of exhaustion, it is cut out, and the next bed 60b which is less exhausted, is made to operate in place of the first. The third bed 60c which may be still less exhausted is then caused to function in the second place, while a new or regenerated bed is cut in to operate in the third place. The cation battery may then continue to operate until again the exhaustion of the first bed necessitates a change. A similar routine may be followed with respect to the operation of the anion exchange battery 61. A practical method of operating a battery such as the cation exchange battery 60 or the anion exchange battery 61, is to allow the degree of average exhaustion of the first bed to develop not further than is justified by the reserve exchange capacity represented by the other, less exhausted beds of the series. In other words, a permissible limit of exhaustion of the first bed should be determined by and correspond to a state of minimum exhaustion of the last bed. Still otherwise expressed, a change or switching of beds should be effected substantially before the "break through" in the last and presumably least exhausted bed occurs. Hence, this is a matter of determining the limits of permissible exhaustion in relation to the exchange reserve capacity of the beds, and maintaining the operation substantially within the limits of that reserve. This will be discussed in further detail in connection with Figs. 8 and 9.

In the present instance, the average degree of exhaustion of a bed at a certain time is measurable in terms of pH of the juice that has been treated in the bed, for the reason that the pH indicates the degree of acidification of the juice as it passes through the cation beds, and also the degree of de-acidification as it passes through the anion beds. After proper operating relations have been established between flow rates of the juice, reserve exchange capacity of the beds, and permissible pH values of the juice treated, a routine for effecting the switching and renewal of the beds may be guided by and established on the basis of such relations and values.

In operation, when the first cation bed is working with an adequate exchange intensity, the juice leaving that bed will have its pH below a predetermined limit, with still sufficient reserve exchange capacity available in the first and the next following bed or beds. As the first bed becomes zone-wise more and more exhausted towards its outlet end, the reserve exchange capacity diminishes, while the pH of the juice treated in the first bed rises, indicating a lessening in the exchange intensity of that bed. Therefore, when the pH has risen to a predetermined value, a switching and renewal of beds should be effected as above indicated, in order to replenish the reserve exchange capacity of the series for another period. Similarly, when the first anion bed is working with an adequate exchange intensity, the juice leaving the first anion bed will have its pH above said predetermined limit, with still sufficient reserve exchange capacity available in the first and the next following bed or beds.

A mode of exchange operation according to the process of this invention lies in the use of only two active cation beds in series followed by two active anion beds in series. In that manner only one cation bed needs to be operated in relation to the other, so balancing is simplified, and likewise the operation of only one anion bed needs to be coordinated to the other. By avoiding "break through" in the respective second beds the operation may be carried along on the safe side as regards reserve exchange capacity.

Regeneration of exhausted beds may be carried on simultaneously with the active operation of the exchanger station. According to the present disclosure regeneration operation comprises substantially three operating phases, namely displacing and washing out sugar juice and of superficial impurities from the bed, treating the bed with the regenerant solution, and displacing and washing out unused or residual regenerant from the bed. These operations are so conducted that the exchange material remains submerged substantially at all times.

I place emphasis, although in no limiting sense, upon the manner in which I conduct the first of these treatment phases, that is the freeing of the bed of juice and of superficial impurities. That is to say, I first displace and wash the juice from the bed by a downward flow of wash water therethrough in order to effect a smooth removal of the juice which has a certain viscosity and also is heavier than the water. I then employ an upward flow of wash water through the bed, whereby the bed is kept in a loosened up condition and whatever superficial matter or impurities may have collected in the bed is washed out. In this way the bed is conditioned for the regeneration phase proper to be performed effectively, as no residual sugar juice will react with the regenerant, and no obstructive superficial impurities in the exchanger material impair its rate of regeneration proper.

In the regenerative treatment of the exchanger a regenerant solution of suitable type, strength, and concentration is used. By conversion in the exchanger the solution is reduced to a point of concentration corresponding to the intensity of conversion or exchange, and correspondingly enriched in salts, as previously explained. Other collected impurities such as dissolved organic matter are also removed from the bed incident to this regeneration, and I have particularly observed varied degrees of coloring in the spent regenerant liquor, which I have interpreted as representing color constituents removed from the juice by the exchanger. Such coloring was notably in evidence in the spent regenerating liquor from the anion beds.

Spent regenerating liquor may be utilized for the values or by-products in it, and previously referred to.

The next phase or washing operation removes unused or residual regenerant from the bed and prevents its reaction with juice thereafter fed to the bed.

In order to sustain the operation of the exchanger station, it appears that at least one extra bed is needed in each battery, besides those currently operating, so that a regenerated bed may be available for active substitution in the battery when required.

An exchanger station to be operated for the purposes of this invention will now be described in still further detail and in connection with Fig. 6 of the drawings.

This station is shown to contain a cation exchange battery 111, and an anion exchange battery 112. An equipment station 113 is disposed between the two batteries for intermediate treatment of the juice if desired. It corresponds to the equipment including the evacuator 84 and the filter 88 shown in Fig. 5, and therefore like parts of this intermediate station are designated by like numerals in Fig. 5 and Fig. 6. However there are shown in Fig. 6 two additional valves 114 and 115 whereby the entire intermediate treatment station 113 can be cut out, while a third valve 116ª when open permits by-passing the intermediate station and direct transfer of juice from the cation exchange battery 111 to the anion exchange battery 112.

The cation exchange battery 111 comprises four units or exchanger beds 111ª, 111ᵇ, 111ᶜ, 111ᵈ. A juice supply header 117 has laterals or branches 118, 119, 120, 121, for selectively feeding juice through respective valves 122, 123, 124, 125, to the exchanger beds 111ª, 111ᵇ, 111ᶜ, 111ᵈ, respectively, the juice entering the bottom portion of the beds as will be seen. A corresponding juice discharge header 126, receives treated juice from the respective top portion of the exchanger beds as will be explained, and for this purpose is provided with corresponding laterals or branches 127, 128, 129, 130, having respective valves 131, 132, 133, 134, through which treated juice may be discharged from the beds 111ª, 111ᵇ, 111ᶜ, 111ᵈ, respectively. The lateral 130 differs somewhat from the laterals 131, 132, 133, in that it terminates in a transverse connection 135 extending between the valves 134 and 114. The first bed 111ª has an inlet connection 136 for juice to be treated, which terminates in a transverse portion 137 which in turn extends between the valve 122 and a valve 138. Treated juice leaves the first bed at the top thereof by way of an outlet connection 139 which through a valve 140 leads into a transfer connection 141 extending between the valves 123 and 131 and leading into the next exchanger bed 111ᵇ through an inlet connection 142 at the bottom thereof and by way of valve 160. Again the juice leaves this bed 111ᵇ at the top through an outlet connection 143 which by way of a valve 144 leads into a transfer section 145 extending between valves 124 and 132, and in turn leading through an inlet connection 146 and valve 147 into the bottom portion of the third exchanger bed 111ᶜ. Juice may leave bed 111ᶜ at the top thereof through an outlet connection 148 and valve 149 into a transfer connection 150 extending between valves 125 and 133, and by way of an inlet connection 151 and valve 152 leading into the bottom portion of the fourth exchanger bed 111ᵈ. Juice may leave the bed 111ᵈ at the top portion thereof through an outlet connection 153 and valve 154 and pass out of the battery through valve 134.

Another transfer connection 155 extends between the valves 138 and a valve 156 for a purpose to be described.

The juice connection and valves just described make it possible to operate the battery in what is herein called a quasi-continuous fashion. That is to say, they permit to pass juice for treatment in series through any three sequentially disposed beds out of the four, while a fourth bed is cut out to be regenerated. For convenience, the beds in which the juice is being treated will be called the active beds, and the ones that are idle, or are being regenerated or have been regenerated will be called the inactive beds.

The ratio of active to inactive beds may be varied, so that for instance only two beds may be kept active and the other two inactive at a time. Such practice is adapted to provide at least one inactive although regenerated bed ready for service while a second inactive bed may be in the process of regeneration.

However, let us assume that beds 111ª, 111ᵇ, 111ᶜ are active, while bed 111ᵈ is inactive. Bed 111ᵈ is cut off the juice supply and discharge system by closing valves 152 and 153. The juice supply to the active beds indicated at 161, enters the supply header 117 by way of a flow meter 162. A valve 163 in a branch connection, whereby the flow meter may be by-passed, is closed. Closed are also the valves 123, 124, 125, and the valves 131, 132, but the juice inlet valve 122 ahead of bed 111ª and the juice discharge valve 133 after bed 111ᶜ are open. Closed are the valves 138, 156, and 134. The juice is then free to pass from supply header 117 through branch connection 118, valve 122, and connection 137 and 136 into the bottom portion of the first exchanger bed 111ª.

The juice rises through the bed at an appropriate rate of flow and in a manner to keep the bed loose without causing in it undue agitation or "boiling over" of the exchanger material. Leaving bed 111ª through the outlet connection 139 the juice moving down through transfer connection 141, inlet connection 142, and valve 160 enters the next exchanger bed 111ᵇ. The juice moves on upwardly through bed 111ᵇ, leaving it through outlet connection 143, passing down transfer connection 145, and through inlet connection 146 and valve 147 into the last active bed 111ᶜ, leaving it through outlet connection 148 and valve 149. The valve setting as described above then permits the juice to pass down the transfer connection 150 and on down through valve 133 leading into the discharge header 126 from where it may flow either through branch 130, connection 135 and valve 114 into the intermediate treatment station 113, or else directly through connection 116 and valve 116ª into the anion exchanger battery 112, where it may follow a course through a series of active beds in a manner similar to the one just described for the cation exchanger battery 117.

If the cation exchanger bed 111ª has become sufficiently exhausted or weakened, it is cut out of active service by closing the valves 122 and 138 at the inlet end and valve 140 at the outlet end thereof. The bed 111ᵈ which now is assumed to have been regenerated, is placed into service by opening the valves 152, 154, and 134, and closing valve 129. Valve 123 is then opened and the juice sent sequentially through beds 111ᵇ, 111ᶜ, and bed 111ᵈ from which the juice passes out of the cation exchanger battery 111 through valves 153 and 134, and connection 135, either through intermediate treatment station 113 or directly into the anion exchange battery 112. Meanwhile bed 111ª is being regenerated.

If next bed 111ᵇ is taken out of active service, the beds 111ᶜ, 111ᵈ, and 111ª will be established sequentially in active service, with juice entering first bed 111ᶜ, then passing through bed 111ᵈ, and finally through bed 111ª. In that instance use must be made of the transfer connection 155 for bringing the juice from bed 111ᵈ at one end of the battery to bed 111ª at the other end of the battery. The valve setting then is such that the juice passes from the supply header 117 through branch 120, valve 124, transfer connection 145, inlet connection 146 and valve 147, exchanger bed 111ᶜ, outlet connection 148, transfer connection 150, inlet connection 151 and valve 152, exchanger bed 111ᵈ, outlet connection 155, valve 138, connection 137, inlet connection 136, exchanger bed 111ª, outlet connection 139, valve 140, transfer connection 141, valve 131, and into the discharge header 126 from where it may go either by way of branch 130, connection 135, and valve 114 to the intermediate treatment station 113, or else directly from the discharge header 126 through connection 116 and valve 116ª into the anion exchange battery 112. Meanwhile the bed 111ᵇ is being regenerated.

Next in line for active service are the beds 111ᵈ, 111ª, and 111ᵇ in that sequence, with bed 111ᶜ taken out of service for regeneration. The juice will then pass from the supply header 117, through branch 121, valve 125, transfer connection 150, inlet connection 151 and valve 152, exchanger bed 111ᵈ, outlet connection 153, valve 154, connection 157, valve 156, transfer connection 155, valve 138, connection 137, inlet connection 136, exchanger bed 111ª, outlet connection 139, and valve 140, transfer connection 141, valve 131, and into the discharge header 126 leading either through branch 130 and valve 114 into the intermediate treatment station 113, or else through connection 116 and valve 116ª directly into the anion exchange station 112. Meanwhile bed 111c is being regenerated.

From the foregoing it will be seen how the active exchanger load can be rotated in a cycle or sequentially through the exchanger beds of a battery in a manner to establish a quasi-continuous operation. Furthermore, an operating routine on the same principle can be established with only two beds active, and the two other beds inactive.

A cyclic operation on the principles described for the cation exchange battery 111 can be practiced similarly with the anion exchange battery 112, so that no separate description thereof is required. For this reason parts of the anion exchange battery 112 are numbered the same as corresponding parts of the battery 111, except for the addition of the distinguishing letter "a" or "a'" respectively.

For the purpose of regenerating the beds of the cation exchange battery 111 there are provided a wash supply header 165, herein briefly called the water header, into which water enters at 166 through a flow-meter 167, and a supply header 168 for the regenerant solution, herein briefly called the regenerant header, into which regenerant solution enters at 169 by way of a flow-meter 170. The anion exchange battery 112 is provided with similar headers for supplying wash water and regenerant solution respectively to the beds, and they are marked 165a and 168a respectively. Branch connections lead from each of the two supply headers in a battery to each unit or exchanger bed thereof, and their arrangement is substantially identical for each bed. It will therefore suffice to describe them in connection with one bed, for instance bed 111a of the cation exchange battery 111.

From the water header 165 a branch connection 171 leads downwardly and terminates in the inlet connection 136, leads into the bottom portion of bed 111a, but may be shut off by a valve 172. A subsidiary branch 173 connects the branch connection 171 with the top portion of the bed 111a by way of a valve 174. By closing the valve 172 and opening valve 174, or vice versa the exchanger bed 111a can be given a downward or an upward wash respectively. The spent wash liquid accordingly can be discharged from the bed either at the bottom or at the top thereof. When washing the bed 111a upwardly the bed is first cut off the juice supply and discharge system by closing valves 122 and 138 and 140, and wash water then allowed to enter through valve 172 and inlet connection 136 at the bottom portion of the bed, then to rise to the outlet connection 139, and to pass out through a connection 175 branching off the outlet connection 139, providing a valve 176 therein is open, and valves 177 and 178 are closed. The spent wash liquid will rise through the riser pipe 179 and by way of an overflow box and adjustable weir 180 discharge into a catch or funnel 181 and run off through pipe 182. The point of overflow may be adjusted in a manner to insure submergence of the exchanger material of the bed.

When washing the bed 111a downwardly, water is allowed to enter through valve 173 at the top portion of the bed, then moving down through the bed, and passing out at the bottom through valve 177, with valves 176 and 178 closed, and then as before to rise through riser pipe 179, overflow box 180, to catch 181 for disposal.

In this way, after a bed such as 111a is taken out of service for regeneration, it can be given first a down wash whereby sugar juice is displaced from and washed out of the bed, followed by an up wash to effect loosening up of the bed with concurrent washing out or flushing out of whatever superficial matter or impurities may have accumulated in the bed or on the granules of the exchanger material thereof.

Thereupon the regeneration phase proper of the bed is entered into by admitting the regenerant solution from the regenerant header 168 through a branch connection 183, and valve 184, and through inlet connection 139 to the top of the exchanger bed 111a, if a downward flow of regenerant through the bed is desired, and providing that valve 185 of a subsidiary branch connection 186 is closed. The spent regeneration liquor in that instance passes from the bed through the discharge connections described for the preceding water wash, namely, by way of valve 177.

If it is desired to pass the regenerant solution upwardly through the bed, the valve 184 is closed and the solution caused to pass through valve 185 and the subsidiary branch connection 186 into the bed 111a at the bottom thereof, and to rise in the bed to the outlet connection 139 from where it passes out as spent regeneration liquor through the same connections described for the earlier upward water wash, that is by way of valve 176. The spent regeneration liquor may be utilized with respect to the recovery therefrom of values or by-products. In the case of beet juice, potassium compound contained in the spent regeneration liquor from the cation exchange beds is an example of such a value or by-product, and it may be returned to the soil whence it came or recovered by special treatment.

For reasons previously explained, the condition or degree of weakening or exhaustion of a bed in active operation, can be judged by the pH of the juice treated by it, and the operation then be conducted accordingly. For this reason Fig. 6 discloses what is known as an automatic or continuous pH indicator, disposed at the outlet end of a bed. Such a pH indicating device is herein shown at the outlet end of each exchanger bed of the cation exchange battery 111 as well as of the anion exchange battery 112, and designated by the numeral 187. An additional one is shown at the inlet end of the juice header 117, as at 188. Also, the pH value of so treated juice can be checked by titration, as against the pH or alkalinity of the incoming juice, and the operating condition thus be gauged. Based on such indications the changing or switching of beds in a battery is undertaken in the manner previously described.

The operating principle of a continuous pH indicator can be seen from Fig. 7 where 188a designates the top portion of an exchanger unit and 189 the outlet connection therefrom for treated juice. A continuous sample stream of juice flows from this outlet connection through a pipe 190 into an overflow or sampling bowl 191, also called electrode bowl, because it carries the test electrodes 192 and 193. The overflowing juice is caught in box 194 from where it is pumped back by pump 195 and through pipe 196 for instance to the top of the bed from which it came.

The electrodes send a continuous impulse corresponding to the pH value of the juice to an indicating instrument herein not shown.

When a bed is being regenerated, and the first or down wash is applied to remove juice, the completeness of that wash can be judged by testing the wash liquid as to its total content of dissolved matter as measured in Brix and determined by refractometer reading. When this content has dropped sufficiently or to substantially zero, the second or up wash may be initiated and continued until the bed is considered free of such impurities as will be flushed out by the water.

When regenerant solution is then passed through the bed, the degree of efficiency of exchange or conversion of the regenerant solution can be judged by the relative drop in the concentration of the regenerant in the spent regeneration liquor. A relative technical and economical optimum of operation may be established by the choice of the concentration apparent in the regenerant liquor, acid or alkaline, whichever the case may be, as compared with the reduction in concentration apparent in the spent regenerating liquor.

When the bed is then washed to remove unused or residual regenerant from the bed, an indication of the completeness of this washing operation can be had by determining the relative amount of those dissolved salts in the spent wash liquid, which were originally found in the spent regenerating solution. Titration test will give such indication. A more sensitive test is by electric conductivity measurement of the spent wash liquid. Automatic or continuous conductivity meters may be provided for this purpose, but are not shown in the drawings.

Test cocks 197 are shown to be provided at various depths of the exchanger bed, to permit testing the condition of the beds in various zones thereof. A conductivity test or continuous conductivity meter numbered 198, if provided at the treated juice outlet end of the anion battery 112, will provide a check up by indicating whatever trace of dissolved salts might be found in the purified juice.

Vent connections 199 are indicated at the top of each exchanger bed in Fig. 6.

Figure 8:
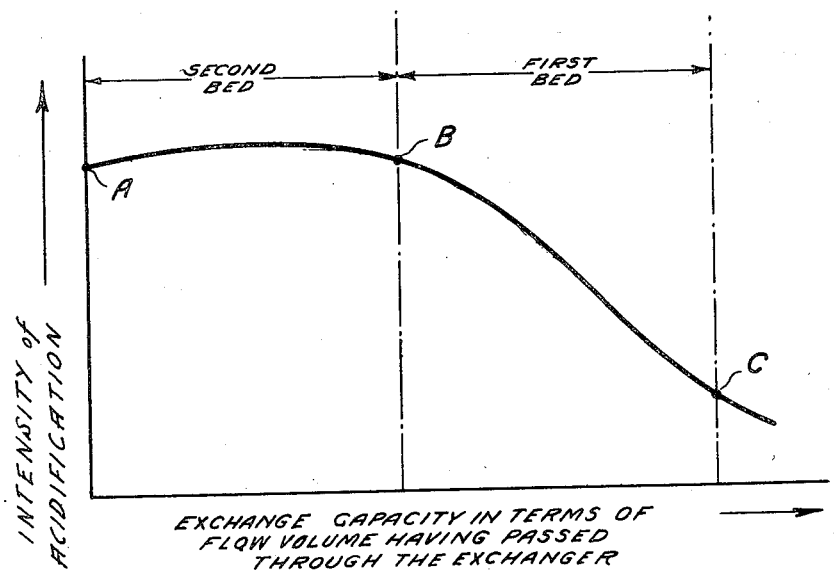
Fig. 8 is a curve indicating the exchange characteristic of a cation exchanger.

Let us consider the case where the juice is treated in a series of two cation beds followed by a series of two anion beds, the treatment being conducted on the basis of titration and pH determination of the juice treated, and with respect to the exchange characteristic of the exchanger, as represented by the curve in Fig. 8. Such an arrangement is diagrammatically shown in Fig. 9 including cation beds $C_1$ and $C_2$, and anion beds $A_1$ and $A_2$.

A capacity curve showing the exchange of a cation exchanger is given in Fig. 8, and the manner of conducting the operation in respect to it will now be discussed.

The diagram in Fig. 8 gives a picture of an exchanger characteristic, that is the intensity of the exchanger in terms of acidification of the juice during cation exchange, as a function of the volume of juice passing through the exchanger. From point A to point B the exchange intensity stays at an average maximum. The phase A—B is called the break-through capacity of the exchanger, the point B being known as the "break-through" point, that is the point at which the exchange intensity begins to weaken. B—C is the range where progressive weakening of the exchange intensity takes place. At point D the degree of weakening or exhaustion may be assumed to have reached a point where regeneration of the exchanger becomes advisable or necessary. In view of such characteristic of the exchanger, and referring to Fig. 8, the operation of the cation beds $C_1$ and $C_2$ may be conducted in such a manner that fresh exchanger is allowed to operate as bed $C_2$ or second bed for a period of time long enough to consume or substantially consume but not substantially to exceed the break-through capacity of the exchanger by acidifying the juice. During the identical time interval the bed $C_1$ may operate through the range B—C, and in an ideal case of operation the point C of exhaustion of bed $C_1$ or first bed will coincide with the break-through point B of bed $C_2$ or second bed.

In order to maintain quasi-continuous operation through a continuous chain of operating cycles, bed $C_2$ is kept going approximately until the break through point B is reached, when it is shifted to displace bed $C_2$ which is removed for regeneration, having reached its lower limit of exhaustion. A new bed $C_2$ is substituted, and a new cycle is started. In this way the capacity of one bed is substantially balanced against that of the other.

Figure 9:
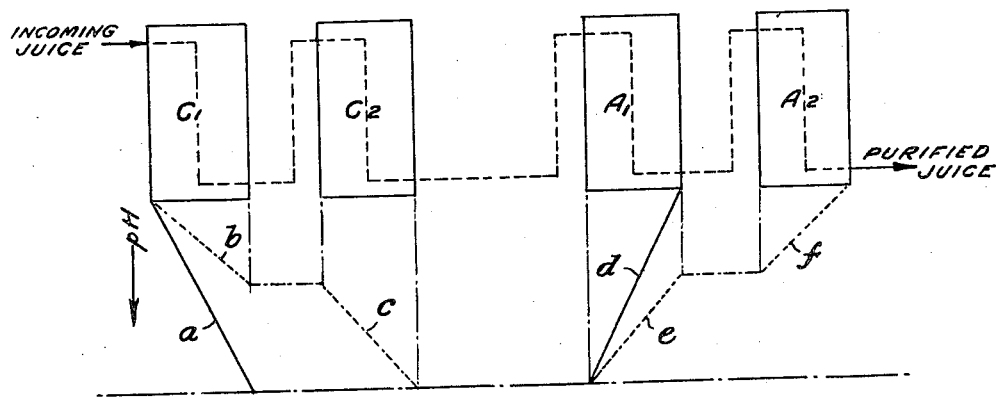
Fig. 9 is a diagram showing the operation of a cation exchanger battery in combination with an anion exchanger battery, in regard to acidification and de-acidification of the juice.

In Fig. 9 this cycle is shown in terms of acidification and de-acidification for the cation beds and the anion beds respectively. This shows that at the beginning of the cycle the major part or substantially all of the acidification is effected in bed $C_1$ according to line ($a$) of the diagram, the subsequent bed $C_2$ substantially not yet being used at that time. However, as the exhaustion of bed $C_1$ proceeds, the effectiveness or exchange intensity of bed $C_1$ approaches a condition indicated by the dotted line ($b$) and correspondingly more exchange burden is placed upon the next bed $C_2$, as indicated by the dotted line ($c$). Corresponding conditions may be assumed to exist in the operation of the anion beds $A_1$ and $A_2$, in which case the full line ($d$) indicates that substantially all of the de-acidification is being effected in the bed $A_1$ alone, at the beginning of the cycle, while the exchange capacity of bed $A_2$ remains substantially unused. Dotted lines ($e$) and ($f$) indicate the condition when the burden of exchange is distributed over both beds $A_1$ and $A_2$.

*Example*

During the campaign a beet juice which had gone through carbonation and sulfitation treatment with subsequent filtration, was obtained in approximately the following condition:

pH: 7.5–8.5
Color: That of the usual carbonated beet juice.
Brix: 12.5–15.0
Apparent purity: (This juice contained no invert sugar) 89–90.
Ash analysis: Inorganic impurities (dissolved): (By furnace test) 0.25–0.30 g./100 g. of thin juice.

After cooling to about 20 to 30 degrees, the juice was subjected to treatment in a series of cation exchange beds containing an organic cation exchange material of resinous type. To be specific, I have used a cation exchanger furnished me by the Resinous Products Co. of Philadelphia, under the name or identification of Amberlite IR.1 which is a material of synthetic resinous nature, and more specifically, a material prepared by the condensation of a dissolved organic chemical of a group comprising sulfonated phenols and aromatic amines, with an aldehyde. This exchanger was regenerated with hydrochloric acid of about 5% concentration. The cation exchange rendered the juice acid to a pH of about 1.8 to 2.0 with an acidity of 0.06 normal by titration with 0.5 N solution of NaOH and relative to the initial pH of the juice.

The juice was then subjected to treatment in a series of anion exchange beds containing an organic anion exchange material also of a resinous type. To be specific, I have used an anion exchanger furnished me by the Resinous Products Co. of Philadelphia, under the name or identification of Amberlite IR.4 which is a material of synthetic resinous nature, and more specifically a material prepared by the condensation of a dissolved organic chemical of a group comprising sulfonated phenols and aromatic amines, with an aldehyde. This anion exchanger was regenerated with a solution of sodium carbonate ($Na_2CO_3$) of about 5% concentration. This treatment reduced the acidity of the juice corresponding to the rate of anionic exchange.

The operation of the cation beds and of the anion beds was so conducted with respect to one another, that the juice as a result of the combined treatment was restored substantially to neutral, having a pH of about 6.0 to 8.0, and an alkalinity by titration of about nil.

The condition of the juice resulting from this purification treatment was approximately, as follows:

pH: 6.0 to 8.0
Color: Water white
Apparent purity: 96.0 to 98.0
Ash analysis:
   (a) (Inorganic impurities dissolved): (By furnace test) 0.01 to 0.002 g./100 g. of finished juice.
   (b) Colloidal impurities: More than 90% were eliminated according to ultra-microscopic colloid count.

By comparison, and from the above, this treatment resulted in a better than 90% removal of dissolved inorganic matter in the juice and a better than 50% removal of dissolved organic matter. The color constituents were reduced to substantially zero.

I claim:

1. A process for the purification treatment of hot sugar-bearing solutions from which solid phase matter has been removed by clarification treatment, and which contains a complexity of solutes comprising sugars and non-sugars, which process comprises cooling the clarified solution to a temperature at which there is realized a congealing of some non-sugars in the solution, subjecting the solution to filtration to remove the congealed matter, subjecting the filtrate solution sequentially to the exchange action of cation- and anion exchanger beds operating in the hydrogen ion and the hydroxyl ion cycle respectively, by passing the solution downwardly through said beds while maintaining the same substantially in submergence, said beds comprising exchanger material in granular form and substantially non-disintegrating in the temporary acidity developed in the solution by the exchange of cations.

2. A process for the purification treatment of hot sugar-bearing solutions from which solid phase matter has been removed by clarification treatment, and which contains a complexity of solutes comprising sugars and non-sugars, which process comprises cooling the solution, subjecting the solution to filtration to remove non-sugars congealed in the solution due to the cooling, subjecting the filtrate solution sequentially to the exchange action of cation- and anion exchanger beds operating in the hydrogen-ion and the hydroxyl ion cycle respectively, by passing the solution downwardly through said beds while maintaining the same substantially in submergence, said beds comprising material in granular form and substantially non-disintegrating in the temporary acidity developed in the solution by the exchange of cations, and utilizing as a cooling medium a quantity of the purified solution flowing from the exchange treatment, whereby that quantity is reheated preparatory to its concentration by evaporation.

3. A process for the purification treatment of hot sugar-bearing solutions which have been subjected to clarification and contain non-sugars of a kind not affected by the clarification, which process comprises cooling the solution to a temperature at which there is realized the congealing of some non-sugars while other non-sugars remain as solutes, separating the congealed non-sugars from the solution, and subjecting the separated solution substantially cool to the action of an H-ion exchange material whereby ionized solutes are changed to corresponding acids.

4. A process for the purification treatment of hot sugar-bearing solutions which have been subjected to clarification and contain non-sugars of a kind not affected by the clarification, which process comprises cooling the solution to a temperature at which there is realized the congealing of some non-sugars, separating the congealed non-sugars from the solution and subjecting the separated solution substantially cool sequentially to the exchange action of cation- and anion exchanger materials operating in the H-ion and in the acid adsorbing cycle respectively for removing non-sugar solutes from the solution.

5. A process according to claim 4, with the addition that as a cooling agent in the cooling step there is utilized a quantity of the purified solution flowing from the exchange treatment whereby that quantity is reheated preparatory to its concentration by evaporation.

6. A process for the purification treatment of hot sugar-bearing solutions that have been subjected to heat-treatment and clarification, which comprises subjecting the resulting colored solution containing non-sugar ionic and non-ionic impurities to treatment for selectively removing such non-ionic impurities that include color constituents which includes congealing such non-ionic impurities into separable solid particles suspended in their menstruum, separating such congealed particles from their menstruum, treating such separated menstruum with cation exchange material operating in the hydrogen cycle for changing ionic impurities thereof into corresponding acids, treating such acidified menstruum with anion exchange material operating in the hydroxyl cycle for changing acids thereof to water, and removing such water to yield a purified sugar.

7. A process for the purification of sugar-bearing solutions that have been subjected to heat-treatment and clarification, which includes subjecting the resulting impure but clarified solution containing non-sugar impurities of ionic and non-ionic types to treatment for selectively removing such non-ionic impurities which comprises congealing such non-ionic impurities into separable solid-phase particles in situ in their menstruum, separating such congealed particles from their menstruum, subjecting the separated menstruum to treatment with cation exchange material at a temperature below that at which inversion takes place significantly whereby ionic non-sugar impurities residual in such menstruum are changed to corresponding acids, and then subjecting such acidified menstruum to treatment with acid-removing anion exchange material whereby such acids are removed.

8. A process for the purification of hot clarified beet sugar solution having therein dissolved ionic as well as non-ionic non-sugar impurities, which comprises changing selectively by congealing in situ a quantity of non-ionic impurities from solution phase to separable solid phase through lowering the temperature of the solution, separating congealed non-ionic impurities at such lower temperature from such solution, subjecting such separated solution to treatment with cation exchange material whereby ionic non-sugars residual in such solution are changed to corresponding acids, and subjecting such acidified solution to treatment with acid-removing anion exchange material.

9. A process according to claim 8, with the addition that the hot clarified beet sugar solution has first been subjected to sulfitation.

FRANKLIN NATHAN RAWLINGS.